Oct. 3, 1961  C. F. DE PRISCO  3,002,270
METHOD AND APPARATUS FOR BONDING METALS
Filed April 3, 1957  2 Sheets-Sheet 1
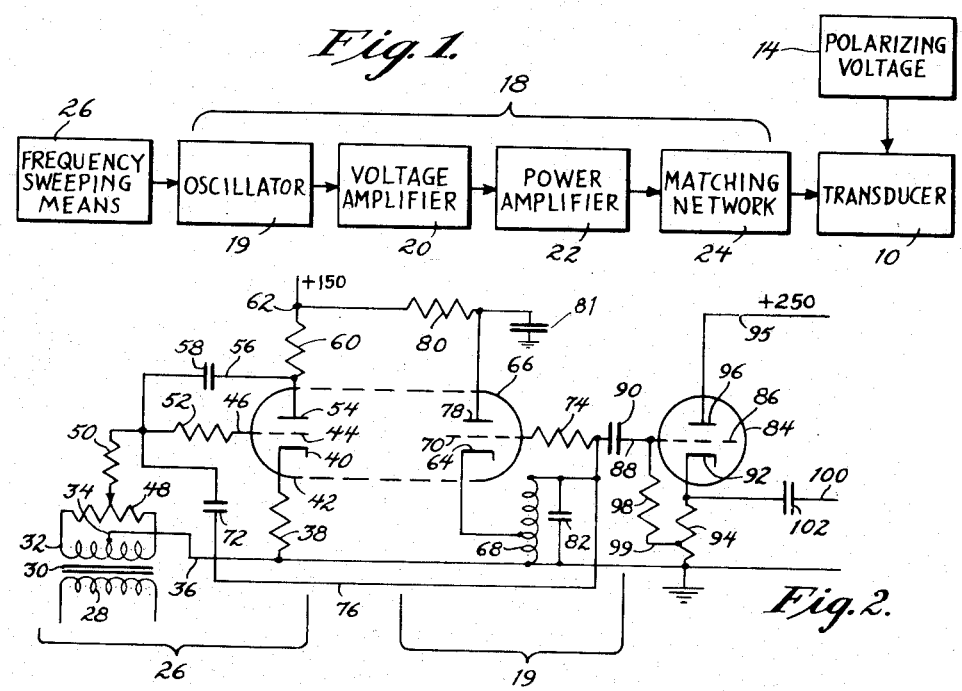
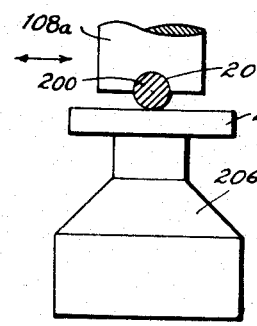
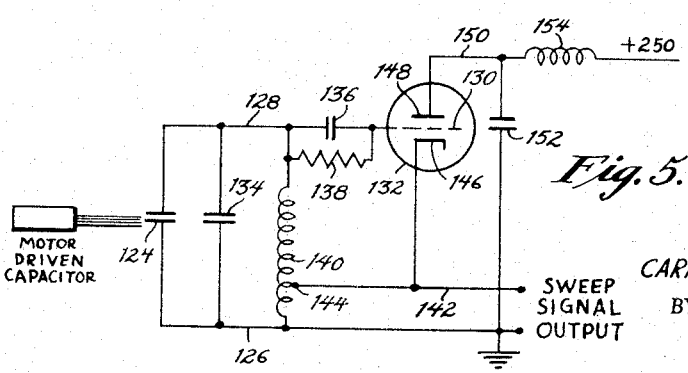
INVENTOR.
CARMINE FRANK DE PRISCO
BY Arthur H. Seidel
ATTORNEY.

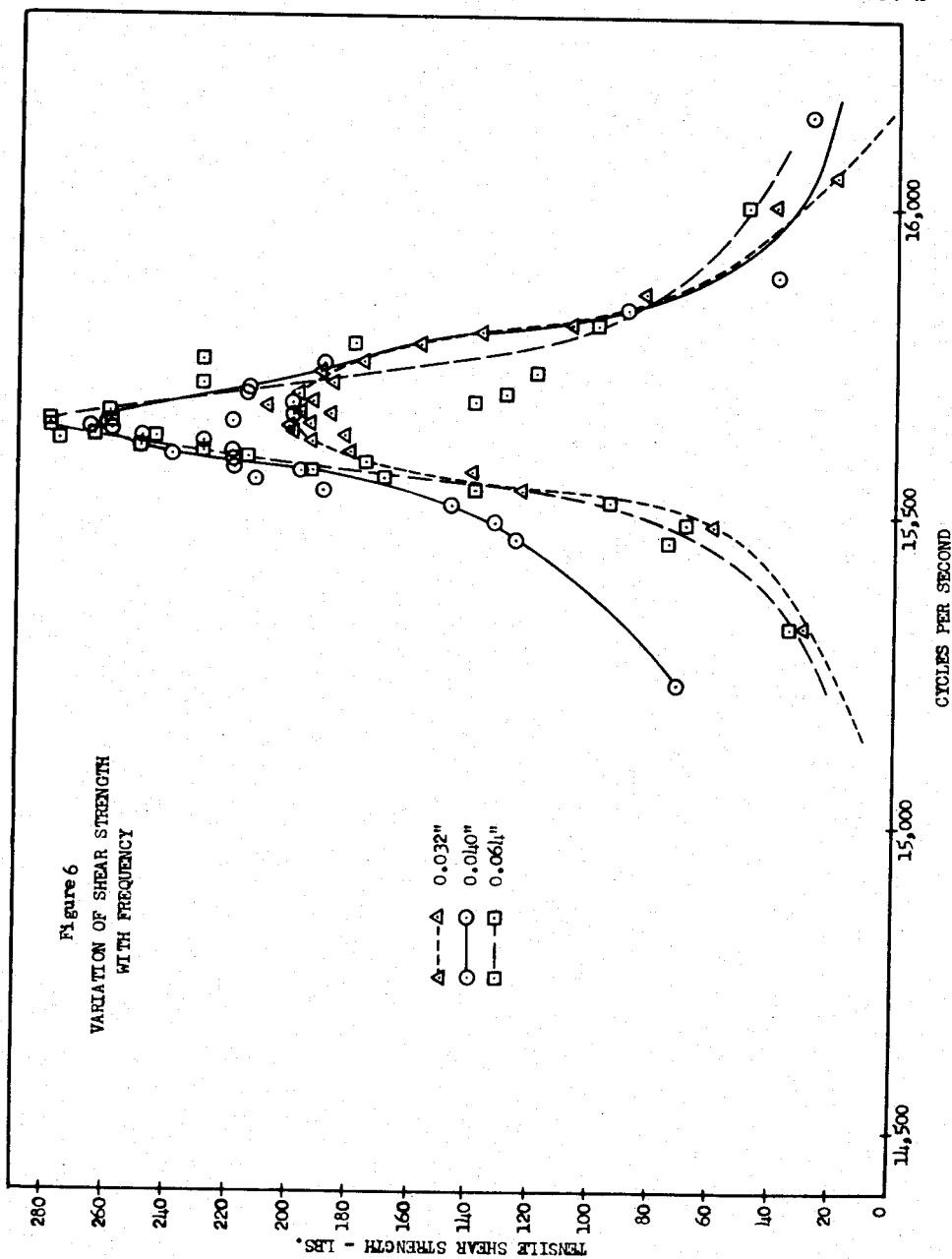

United States Patent Office 3,002,270
Patented Oct. 3, 1961

3,002,270
METHOD AND APPARATUS FOR BONDING METALS

Carmine Frank De Prisco, West Chester, Pa., assignor, by mesne assignments, to Sonobond Corporation, West Chester, Pa., a corporation of Pennsylvania
Filed Apr. 3, 1957, Ser. No. 650,539
9 Claims. (Cl. 29—470)

The present invention relates to a method and apparatus employing vibratory energy for bonding metals, and more particularly, to a welding process for joining together or bonding metal members through the application of vibratory energy effected under the optimum conditions of frequency for the electronic, transducer, and coupling systems which comprise the welding array.

United States patent applications Serial No. 467,382, filed November 8, 1954, now abandoned, for "Method and Apparatus Employing Vibratory Energy for Bonding Materials"; Serial No. 579,780, filed April 23, 1956, for "Method and Apparatus Employing Vibratory Energy for Bonding Metals," and now Patent 2,946,119; Serial No. 579,779, filed April 23, 1956, now abandoned, for "Vibratory Seam Welder and Vibratory Seam Welding Process"; and Serial No. 610,991 filed September 5, 1956, for "Method and Apparatus Employing Vibratory Energy for Bonding Metals," each of which applications is in the name of James Byron Jones, William C. Elmore, and Carmine F. De Prisco, disclose apparatus for and a method of bonding metals together in which the contacting surfaces of the metals to be bonded are held under sufficient force to hold them together in firm contact at the intended weld interface and while the metals are so-retained, vibration is applied to the weldment so as to produce either shear vibration or a combination of shear and compressive vibration in the interference being bonded.

I have discovered that the weld consistency and strength, especially in the heavier thicknesses of metal, in weldments obtained through the aforesaid vibratory welding process or utilizing the aforesaid vibratory welding apparatus may be improved resulting in weldments possessing greater weld strength by wobbling the frequency during welding by at least 10 cycles, as within the range of 2 percent around the center frequency at which welding is effected,[1] and/or generally within the range of 10 to 1000 cycles per second around the center frequency,[2] and preferably within the total range 50 to 100 cycles per second around the center frequency at which welding is effected. Thus, the present invention comprehends a vibratory welding process in which vibration is applied to the weldment so as to produce either shear vibration or a combination of shear and compressive vibration with the frequency of the vibration being wobbled continuously during the welding within the aforesaid ranges of 2 percent around the center frequency and/or 10 to 1000 cycles per second around the center frequency. The present invention also comprehends the provision of apparatus for effecting such welding in which the frequency of the vibration is continuously wobbled within the aforesaid range.

While I do not wish to be bound by any theory as to why better weldments may be secured by the process and apparatus of the present invention, it is my belief that the resonant frequency characteristics of the vibratory welding apparatus described in the aforesaid Jones, Elmore and De Prisco applications may require slight adjustment, depending upon the metal or alloy and the thickness thereof that is being welded. It is also possible that the acoustical impedance of the weldment changes very slightly during the very short welding cycle, and that this slight effect, which is in no way related to the transducer-coupling-mounting systems described in the aforesaid Jones, Elmore, and De Prisco applications and their general force-insensitivity produces a slight alteration in the specific frequency at which the best weldments are produced. It is also my belief that there is a most effective frequency for each apparatus unit and for each workpiece metal. In particular, experimental studies have indicated to me that frequently the exactitude of frequency tuning becomes more rigorous in vibratory welding methods with harder and thicker metals, However, due to the above-indicated changes in best welding frequency during welding it is most difficult, if not impossible, to maintain any given welding unit at its most effective frequency under operating conditions for a given metal workpiece.

By wobbling the frequency of the vibratory welding apparatus by at least 10 cycles, as within a range of 2 percent around the center frequency at which welding is effected, and/or generally within the range of between 10 and 1000 cycles per second around the center frequency at which welding is effected, and preferably within the total range of 50 to 100 cycles per second after the apparatus has been tuned to the approximate best welding frequency, it is possible to compensate for the variations derived from the changes in the best welding frequency of the apparatus during welding, and moreover, the criticality of precise tuning for the apparatus may be eliminated. While frequency wobbling over a range of at least 10 cycles and greater than 2 percent around the center frequency at which welding is effected or 1000 cycles around the center frequency at which welding is effected may be utilized, there is generally no point in wobbling the frequency above these figures. The process of the present invention has primary utility for the welding of hard and thick metal members, but may be used for the welding of all metals.

Wobbling of the frequency may be accomplished in accordance with the present invention by a variety of conventional means whose construction is well known and understood by those skilled in this art, and whose exact construction forms no part of the present invention. Thus, my invention comprehends the use of electronic means and/or mechanical means for wobbling the frequency of the vibration transmitted to the vibratory welding apparatus of the present invention within predetermined limits.

This invention has as an object the provision of an improved welding method.

This invention has as an object the provision of a method for forming weldments possessing superior strength characteristics.

This invention has as yet another object the provision of a vibratory welding method for welding together a plurality of metal members in which tip sticking from the welding unit tips may be alleviated.

This invention has as yet another object the provision of improved welding apparatus.

This invention has as a still further object the provision of apparatus for vibratorily welding metal members together in which weldments having superior strength characteristics are obtained.

Other objects will appear hereinafter.

For the purpose of illustrating the invention there are shown in the drawings forms which are presently preferred; it being understood, however, that this invention is not limited to the precise arrangements and instrumentalities shown.

---

[1] That is within the range which comprises at least 10 cycles and is 1% below the center frequency and 1% above the center frequency.
[2] That is within the range which comprises 5 to 500 cycles per second below the center frequency and 5 to 500 cycles per second above the center frequency.

Referring to the drawings, which are partly schematic, and wherein like reference characters refer to like parts:

FIGURE 1 is a block diagram of the power supply and frequency sweep for the magnetostrictive transducer of a vibratory welder.

FIGURE 2 is a schematic diagrammatic view of one embodiment of means for wobbling the frequency and oscillator, voltage amplifier, and matching network, which incorporates electronic components and which may be used in the vibratory unit of the present invention.

FIGURE 3 is a side elevational diagrammatic view of a vibratory welder.

FIGURE 4 is a side elevational diagrammatic fragmentary view of another embodiment of a vibratory welder.

FIGURE 5 is another embodiment of means for wobbling the frequency in which mechanical means are utilized in conjunction with electronic means for effecting frequency wobbling.

FIGURE 6 is a graph revealing the variation in shear strength in weldments of different thicknesses effected at different frequencies.

Referring now to the drawings, the magnetostrictive transducer for the welder of the present invention is designated 10 and includes a core formed of laminated magnetostrictive material of a suitable metal, such as nickel, Permendur (a cobalt-iron alloy), etc. Magnetostrictive transducer 10 includes a winding 12 which is connected to a direct current supply 14 which serves as a source of polarizing current. Magnetostrictive transducer 10 is also provided with a second winding 16 which is connected to a source of alternating current designated by the numeral 18. It will be readily appreciated by those skilled in the art that the alternating current voltage from the A.-C. power supply is superimposed upon the polarizing voltage to produce vibrations of the magnetostrictive core of the magnetostrictive transducer 10 at the frequency of the A.-C. power supply 18. The A.-C. power supply 18 comprises an oscillator 19 which is fed to a voltage amplifier 20, thence to a power amplifier 22, thence to a matching network 24, and thence to winding 16 of magnetostrictive transducer 10.

In accordance with the invention, means for sweeping or wobbling the frequency designated 26 controls oscillator 19 and wobbles the frequency of the alternating current transmitted from oscillator 19 in the manner set forth above to transducer 10 within a predetermined range. The present invention comprehends wobbling the frequency by at least 10 cycles, as within the range of 2 percent around the center frequency at which welding is effected and/or generally 10 to 1000 cycles per second around the center frequency at which welding is effected, and preferably within the total range of between 50 and 100 cycles per second.

While the circuit in the illustrated embodiment is wobbled at the conventional 60 cycle per second alternating current rate, other wobbling rates may be utilized, and any of the other conventional alternating current wobble rates such as 33 cycles per second, 50 cycles per second, etc. up to 1000 cycles per second or so are satisfactory. Adjusting the wobbling rate may be accomplished by means well known to those skilled in the art. The present invention also comprehends wave forms other than sine waves, such as sawtooth, triangular, or other wave forms known to those skilled in the art.

Two different means for wobbling the frequency are illustrated in the accompanying drawings, one means being shown in FIGURE 2 and the other means in FIGURE 5. It is to be understood that means for wobbling the frequency are well known to those skilled in the electronics art and any one of the variety of suitable means for wobbling the frequency known to the art may be incorporated into the present invention.

In the embodiment shown in FIGURE 2 the voltage at the determined sweep frequency rate is applied to the primary winding 28 of sweep voltage transformer 30. The secondary winding 32 of sweep voltage transformer 30 is provided with a center tap 34 which is connected by conductor 36 to ground. The signal voltage at the frequency desired for the sweep is applied between grid 44 and cathode 40 of reactance triode 42 through conductor 46, adjustable resistor 48, resistor 50 and resistor 52 to the grid 44 and to resistance 38 connected to the cathode 40. The amplitude of the aforesaid voltage can be controlled by sliding the arm of variable resistance 48. The plate 54 is connected to power supply of +150 volts D.-C. through conductor 62 and resistor 60. This permits the signal output from the reactance triode tube 42 to be fed back through capacitor 58 to grid 44 and through capacitor 72 to the oscillator tank circuit 68 and 82. The reactance of the circuit of tube 42 is thus placed across the tank circuit 68 and 82 and controls the resonant frequency of the tank circuit 68 and 82 over the wobbled frequency range. The oscillator triode 66 is set so that when reactance tube 42 is inactive the oscillator triode 66 operates at the center frequency hereinafter referred to as $f_0$. The plate 78 of triode 66 is furnished with positive D.-C. voltage through resistor 80 and the oscillator signal return circuit is completed by capacitor 81.

To effect oscillation, voltage is fed back from tank circuit 68 and 82 to grid 70 of oscillator triode tube 66 through resistor 74 and capacitor 81. The output from oscillator triode tube 66 is taken through coupling capacitor 90 and conductor 88 to grid 86 of cathode follower output triode tube 84. Grid 86 is returned through resistor 98 and conductor 99 to tap 94 selected to give correct D.-C. bias for the particular triode used.

The plate 96 of cathode follower 84 is directly connected through conductor 95 to a power supply of +250 volts D.-C.

Transducer winding 16 is connected through matching network 24 via power amplifier 22, voltage amplifier 20 and coupling capacitor 102 to cathode 92.

Referring now particularly to FIGURE 3, wherein there is shown a schematic view of one embodiment of a vibratory welder, it is seen that the transducer 10 provides the vibratory motion for the welding apparatus designated generally by the numeral 104. Thus, transducer 10 is connected to one end of a coupling member 106, which may comprise a tapered horn-shaped member, a conical member, or a cylindrical member. The coupling member 106 is angularly connected, as at right angles, to a vibration-transmitting member 108 which may comprise a metal rod, rigidly supported and downwardly urged by means of a massive support designated 110 and a variable force designated 111.

Coupling member 106 is preferably rigidly secured, as by brazing, or the like to vibration-transmitting member 108, with one end portion of coupling member 106 engaging the vibration-transmitting member 108 in end-to-end contact.

The vibration-transmitting member 108 is excited as a reed and bends in respect to its support 110, and transmits the vibration of the coupling member 106 in a direction along its axis. However, a primary component of the vibratory energy transmitted to the metal elements 112 and 114 undergoing welding is lateral vibration (shear vibration) introduced by the tip 116 of vibration-transmitting member 108 which moves in the tangent plane of the upper surface of metal element 112 (see double-headed arrow indicating direction of movement of tip 116), which in the case of flat sheets 112 and 114 constitutes vibration generally parallel to the contacting surfaces of the metal elements 112 and 114. This is also a component of the vibratory energy that is normal to the plane of the weldment member 112.

An anvil or supporting member 120 is axially spaced from the tip 116 of vibration-transmitting member 108. Anvil 120 is provided with a base 122 upon which it may be supported. Anvil 120 may comprise a heavy mass, a short rod-like member, or the like. When the anvil 120 assumes the form of a heavy mass it need have no particular length. When in the form of a short rod-like member, it may be desirable in some instances to regulate the length of anvil member 120 so that it is detuned in bending vibration at the applied frequency in respect to its base 122, e.g. to be non-resonant with the applied vibratory frequency of the transducer-coupling system, and thus reflect much of the elastic vibratory energy introduced to the metal elements 112 and 114 undergoing welding.

In place of the vibratory welding apparatus shown in FIGURE 3, other vibratory welding embodiments such as are disclosed in above-referred to patent applications Serial Nos. 467,382; 579,780; 579,779; and 610,991 may be utilized. Thus, in an alternative embodiment of the present invention the welder may comprise a continuous or seam welder in which the metal members undergoing welding are passed continuously between the vibration-transmitting member and the anvil, or the various seam welding embodiments disclosed in above-referred to patent application Serial No. 579,779 may be utilized.

In the embodiment of the present invention shown in FIGURE 4 one of the metal members 200 undergoing welding is a cylindrical element such as an aluminum wire and is welded to the upper surface of a metal plate 202. In this embodiment the vibration-transmitting member 108a generally resembles vibration-transmitting member 108 except that it is provided with a semicircular concavity 204 on its underside which partially embraces wire 200.

Metal plate 202 is supported on anvil 206, with the underside of the metal plate 202 being frictionally engaged with the upper surface of anvil 206 due to the downward axial force exerted by the vibration-transmitting member 108a.

The welding of wire 200 to metal plate 202 is accomplished by the lateral vibratory movement of vibration-transmitting member 108a in the path indicated by the double-headed arrow and in part by the component of vibration that is normal to the plane of metal plate 202. The vibratory movement of vibration-transmitting member 108a may be accomplished by the same transducer and coupling arrangement shown in FIGURE 5.

In the embodiment of FIGURE 4 the prime elastic vibratory component is in the plane of the contacting surfaces of the metal members undergoing welding.

While the invention has been illustrated for metallic magnetostrictive transducers, the transducer may comprise almost any material which has good physical properties and which changes its physical dimensions under the influence of an electric potential. Thus, it may comprise a piezoelectric ceramic, such as barium titanate, or lead zirconate, or a natural piezoelectric material, such as quartz crystals. Such materials are preferably used at high frequency operations, as at frequencies above about 75,000 cycles per second. The transducer may also consist of ferroelectric materials or an electromagnetic device, such as that which actuates a radio loudspeaker.

The welding process of the present invention is effected under a clamping pressure sufficient to hold the metals being welded in firm contact at the intended weld interface.

The clamping pressure may thus be varied over a very wide range. Thus, in a preferred embodiment of the present invention, the maximum clamping pressures need not produce an external deformation [3] of more than about 10% in weldments effected at room or ambient temperatures. In many cases the extent of deformation is appreciably below 10% and in some instances may be virtually absent altogether. The minimal clamping pressure to be used in the process of our invention constitutes a pressure sufficient to maintain the metals being welded in operative disposition, e.g. contacting each other so that the weld may be effected by the application of vibratory energy.

The range of operative clamping pressures which may be employed in the process of the present invention may be readily ascertained by the user of the process. In all cases the clamping pressure must be sufficient to effect coupling between the metals being welded and the source of vibratory energy, so that such vibratory energy may be transmitted to the metals.

The operative range of vibratory welding frequencies which may be used in the process of my invention includes frequencies within the range 59 to 300,000 cycles per second, with the preferred range constituting 400 to 75,000 cycles per second, and the optimum operating frequency range lying between about 5,000 and 40,000 cycles per second. This optimum range of operating frequencies may be readily achieved by transducer elements of known design, which are capable of generating elastic vibratory energy of high intensity.

Welding in accordance with the process of my invention may be and in many instances is initiated at room temperatures or ambient temperatures without the application of heat.[4] If desired, welding in accordance with the process of my invention may also be initiated at elevated temperatures below the fusion temperature (melting point or solidus temperature of any of the pieces being bonded).[5] Thus, heating the metals to be welded prior to, and/or during welding to a temperature below their fusion temperature may, in some cases, facilitate the ease of welding and lower the power requirements and/or time requisite to achieve welding. The welding process of my invention is applicable to forming both spot and seam welds.

The welding process of my invention may be applied to a wide variety of metals, examples of which include: pure aluminum to pure aluminum; aluminum alloy to aluminum alloy; copper to copper; brass to brass; magnesium alloy to magnesium alloy; nickel to nickel; stainless steel to stainless steel; silver-titanium alloy to silver-titanium alloy; gold-platinum alloy to stainless steel; platinum to copper; platinum to stainless steel; gold-platinum alloy to nickel; titanium alloy to titanium alloy; molybdenum to molybdenum; aluminum to nickel; stainless steel to copper alloy; nickel to copper alloy; nickel alloy to nickel alloy; sintered aluminum powder to sintered aluminum powder;[6] etc.

The spot-type welding process embodiment of the present invention may be accomplished within a wide time range, such as a time range of between about 0.001 second to about 6.0 seconds, or somewhat more, with welding under most normal conditions being effected during a time interval of from several hundredths of a second to several seconds.

The welding of most metals can be effected in accordance with the process of my invention in the ambient atmosphere. However, the process of my invention comprehends welding in highly evacuated atmospheres, or in selected atmospheres, such as atmospheres comprising an inert gas. Furthermore, while the welding process of my invention may be effected with metals, such as aluminum, without the extensive precleaning required to effect satisfactory welding by other methods, a degree of precleaning and surface treatment may prove advantageous in the welding of many metals. It is desirable prior to effecting welding in accordance with the present inven-

---

[3] By deformation is meant the change in dimensions of the weldment adjacent the weld zone divided by the aggregate thickness of the weldment members prior to welding; result multiplied by 100 to obtain percentage.

[4] The weldment may be warm to the touch after the weld due to the application of the vibratory energy.
[5] The temperatures to which the foregoing statements refer are those which can be measured by burying diminutive thermocouples in the weld zone prior to welding, as well as the temperatures which can be estimated or approximated from a metallographic examination of a cross-section of a vibratory weld in the ordinary magnification range up to about 500 diameters.
[6] A mixture consisting of elemental aluminum and aluminum oxide.

tion to remove surface contaminants, such as hydrocarbon lubricants and the like.

In FIGURE 5 there is shown a conventional oscillator circuit with frequency controlling means consisting of tank circuit fixed inductance 140 and capacitance 134 to which has been added a means for varying the frequency consisting of a motor driven capacitor 124 placed in parallel with capacitor 134 resulting in a variation in the capacitance of the tank circuit which in turn results in the variation of frequency oscillation.

The motor driven capacitor 124 is in parallel with the tank circuit consisting of inductor 140 and capacitor 134.

The tank circuit is connected to the grid 130 of oscillator triode 132 through grid leak 138 and grid condenser 136. The cathode 146 is connected to tap 144 of inductance 140. The plate 148 is connected back to the tank circuit and through capacitor 152 via conductor 150 and is isolated from the power supply by inductance 154. Feedback is achieved through capacitor 152 to the ground.

As an example of a weldment which may be made in accordance with the present invention is the welding of 0.032 inch 2S aluminum sheet to 0.064 inch 2S aluminum sheet with a vibratory welder having a transducer and array designed and dimensioned for operation at a center frequency ($f_0$) of 15,000 cycles per second, improved welds may be obtained when the frequency is varied in accordance with the process of the present invention, as between a frequency of 14,970 cycles per second and a frequency of 15,030 cycles per second. By wobbling the frequency within this 60 cycle range the most effective region in which good welds may be obtained is adequately embraced.

Similar results may be obtained with the welding of a wide variety of additional metals, and especially harder metals, such as metals comprising iron.

FIGURE 6 is a graph which reveals the variation of shear strengths in 1100–H 14 aluminum sheets of the three thicknesses set forth on graph (e.g. weldments of (a) 0.032 inch aluminum to 0.032 inch aluminum effected at a maximum power level of 325 effective watts; (b) 0.040 inch aluminum to 0.040 inch aluminum effected at a maximum power level of 550 effective watts; and (c) 0.064 inch aluminum to 0.064 inch aluminum effected at a maximum power level of 565 effective watts) under a clamping load of 165 pounds and a welding time of 1.5 seconds. It is evident that the most effective welding frequency varies depending upon the thickness of the metals undergoing welding. Similar variations are noted in the welding of metals other than aluminum.

The present invention may be embodied in other specific forms without departing from the spirit or essential attributes thereof and, accordingly, reference should be made to the appended claims, rather than to the foregoing specification as indicating the scope of the invention.

I claim:

1. A non-fusion method of welding metal members together which method comprises placing to-be-welded faces of the metal members together, applying a force to the metal members in a direction and of a magnitude to hold the contacting to-be-welded faces of the metal members in intimate contact at the intended weld zone and to couple mechanical vibratory energy into said zone, introducing through a vibrating element contacting one of the to-be-welded metal members adjacent the weld zone mechanical vibration having a frequency of between 59 and 300,000 cycles per second, said mechanical vibration comprising a vibration component in a direction substantially perpendicular to the direction of applied force, and with such component being of an energy level sufficient to weld the metal members to each other, and varying the frequency of the vibratory energy within a range of 10 to 1,000 cycles per second around the center frequency at which welding is being effected.

2. A method in accordance with claim 1 in which the frequency of the vibratory energy is varied within the range of 50 to 100 cycles per second around the center frequency at which the welding is effected.

3. A method in accordance with claim 1 in which the frequency of the vibratory energy is varied within a range of at least 10 cycles and two percent of the frequency around the center frequency at which welding is being effected.

4. Apparatus for non-fusion welding contacting metal members together comprising a force-applying member, means for impelling an end portion of said force-applying member against an outer face of one of said contacting metal members with a force in a direction and of a magnitude to hold the to-be-welded faces of the metal members in intimate contact at the intended weld zone and to couple mechanical vibratory energy into the intended weld zone, and means for vibrating said end portion of said member at a frequency of between 59 and 300,000 cycles per second in a path substantially perpendicular to the direction of the applied force while such to-be-welded faces of the metal members are being held in intimate contact by engagement with said end portion of said member, means for selectively varying said frequency between 10 and 1,000 cycles per second around the center frequency while the weld is being effected, with said vibrating means furnishing sufficient power so that the mechanical vibration delivered by said end portion in said path is at a sufficient energy level to weld the metal members together.

5. Apparatus in accordance with claim 4 wherein said varying means varies the frequency of vibration between 50 and 100 cycles per second around the center of frequency while a weld is being effected.

6. Apparatus in accordance with claim 4 wherein said varying means varies the frequency within a predetermined range of not more than two percent of the center frequency of the vibratory energy produced by the means for vibrating said end portion while the weld is being accomplished.

7. Apparatus in accordance with claim 4 wherein said varying means includes an oscillator circuit connected to said means for vibrating said end portion, and an electronic control circuit connected to said oscillator circuit for varying the frequency of alternating current transmitted by said oscillator circuit.

8. Apparatus in accordance with claim 7 wherein said electronic control circuit is a frequency sweeping circuit having an active reactance element, and said oscillator circuit having an active element operating at the center frequency when said active reactance element is inactive.

9. Apparatus in accordance with claim 7 wherein said electronic control circuit is a tank circuit, a motor driven capacitor in parallel with a capacitor of said tank circuit for varying the capacitance of the tank circuit, whereby variations in the capacitance of said tank circuit results in a variation of said vibration frequency.

References Cited in the file of this patent

UNITED STATES PATENTS

| 2,619,604 | Burns | Nov. 25, 1952 |
| 2,651,148 | Carwile | Sept. 8, 1953 |
| 2,670,446 | Turner | Feb. 23, 1954 |
| 2,834,158 | Petermann | May 13, 1958 |
| 2,946,119 | Jones et al. | July 26, 1960 |

FOREIGN PATENTS

| 1,087,440 | France | Feb. 23, 1955 |

OTHER REFERENCES

Welding Journal, October 1959, pp. 969–975.